United States Patent
Paganetti et al.

(10) Patent No.: US 8,296,827 B2
(45) Date of Patent: Oct. 23, 2012

(54) METHOD FOR ENABLING AN ADMINISTRATOR TO CONFIGURE A RECOVERY PASSWORD

(75) Inventors: Robert J. Paganetti, Scituate, MA (US); David S. Kern, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 11/323,986

(22) Filed: Dec. 29, 2005

(65) Prior Publication Data

US 2007/0157032 A1    Jul. 5, 2007

(51) Int. Cl.
*H04L 29/06* (2006.01)
(52) U.S. Cl. .......................................................... 726/5
(58) Field of Classification Search .................. None
See application file for complete search history.

(56) References Cited

U.S. PATENT DOCUMENTS

| | | | |
|---|---|---|---|
| 5,815,573 A * | 9/1998 | Johnson et al. | 380/286 |
| 5,937,066 A * | 8/1999 | Gennaro et al. | 380/286 |
| 6,396,929 B1 * | 5/2002 | Chandersekaran et al. | 380/286 |
| 6,662,299 B1 * | 12/2003 | Price, III | 713/171 |
| 7,379,551 B2 * | 5/2008 | Chan et al. | 380/286 |
| 7,831,833 B2 * | 11/2010 | Gaylor | 713/176 |
| 2001/0055388 A1 * | 12/2001 | Kaliski, Jr. | 380/30 |
| 2002/0032573 A1 | 3/2002 | Williams et al. | |
| 2002/0107877 A1 | 8/2002 | Whiting et al. | |
| 2003/0182584 A1 * | 9/2003 | Banes et al. | 713/202 |
| 2004/0162786 A1 * | 8/2004 | Cross et al. | 705/59 |
| 2004/0250139 A1 | 12/2004 | Hurley | |
| 2005/0005174 A1 | 1/2005 | Connors | |
| 2005/0171872 A1 * | 8/2005 | Burch et al. | 705/29 |
| 2005/0192008 A1 * | 9/2005 | Desai et al. | 455/435.2 |
| 2005/0216531 A1 * | 9/2005 | Blandford | 707/204 |
| 2005/0289644 A1 * | 12/2005 | Wray | 726/5 |

\* cited by examiner

*Primary Examiner* — David Pearson (57) ABSTRACT

A method is provided for a enabling a user to initiate a password protected backup copy of the user's credentials. The method includes providing a user with a credential store containing information relating to the user's identity, generating a different recovery password of any length for each recovery authority, encrypting the recovery password for each recovery authority, storing the encrypted recovery passwords in the credential store, and sending a copy of the information by the user from the credential store to a central repository.

24 Claims, 6 Drawing Sheets

METHOD FOR ENABLING AN ADMINISTRATOR TO CONFIGURE A RECOVERY PASSWORD

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to the ability for a user to initiate a password protected backup of his credentials and, more particularly, to recovering his credentials even if the user forgets his password.

Figure 1:
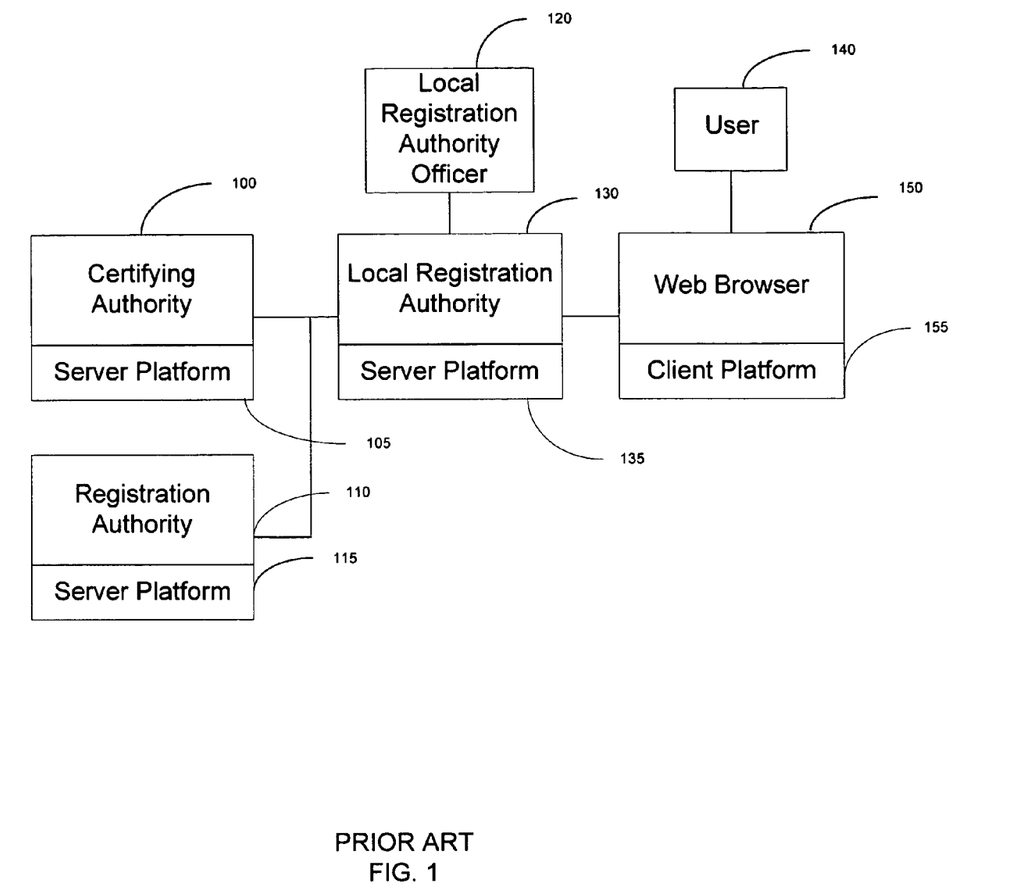
FIG. 1 shows a block diagram of an example PKI system architecture, according to the prior art.

FIG. 1 shows a block diagram of an example Public Key Infrastructure (PKI) system architecture, according to the prior art. A PKI is a collection of servers and software that enables an organization, company, or enterprise to distribute and manage thousands of unique public/private cryptographic keys in a manner that allows users to reliably determine the identity of the owner of each public/private key pair. Public/private key pairs have the property that for any given public key there exists one and only one private key, and vice versa. If a particular message can be decrypted using one member of the key pair, then the assumption is that the message must have been encrypted using the other member.

Certificates may contain information identifying the owner of the key pair, the public component of the pair and the period of time for which the certificate is valid. The certificate may also identify technical information about the key itself, such as the algorithm used to generate the key, and the key length. Certificates are generated by organizations, companies, or enterprises that are responsible for verifying the identity of individuals to which certificates are issued. The certifying authority 100, in FIG. 1, signs each certificate using a private key known only to the certifying authority itself. By issuing a certificate, a certifying authority 100 is stating that it has verified that the public key that appears in the certificate belongs to the individual listed in the certificate.

Current PKIs that provide strong authentication of user identity accomplish this via the use of a Local Registration Authority Officer (LRAO) 120. LRAO 120 operates at a workstation or server platform 135 that runs a local registration authority 130. Server platform 135 may be any known computing device that may serve as a server, e.g. computer, workstation, etc. The local registration authority 130 interfaces with other server platforms that may contain applications such as the certifying authority 100 and registration authority 110.

A user 140, that is using or desires access to the PKI system architecture, accesses the system via a web browser 150 on a client platform 155. Typically, in current systems, user 140 presents a photo I.D. to the LRAO 120 in order to authenticate the user's identity. LRAO 120 then uses workstation 135 and local registration authority 130 to signal registration authority 110 to register new user 140 in the system.

Figure 2:
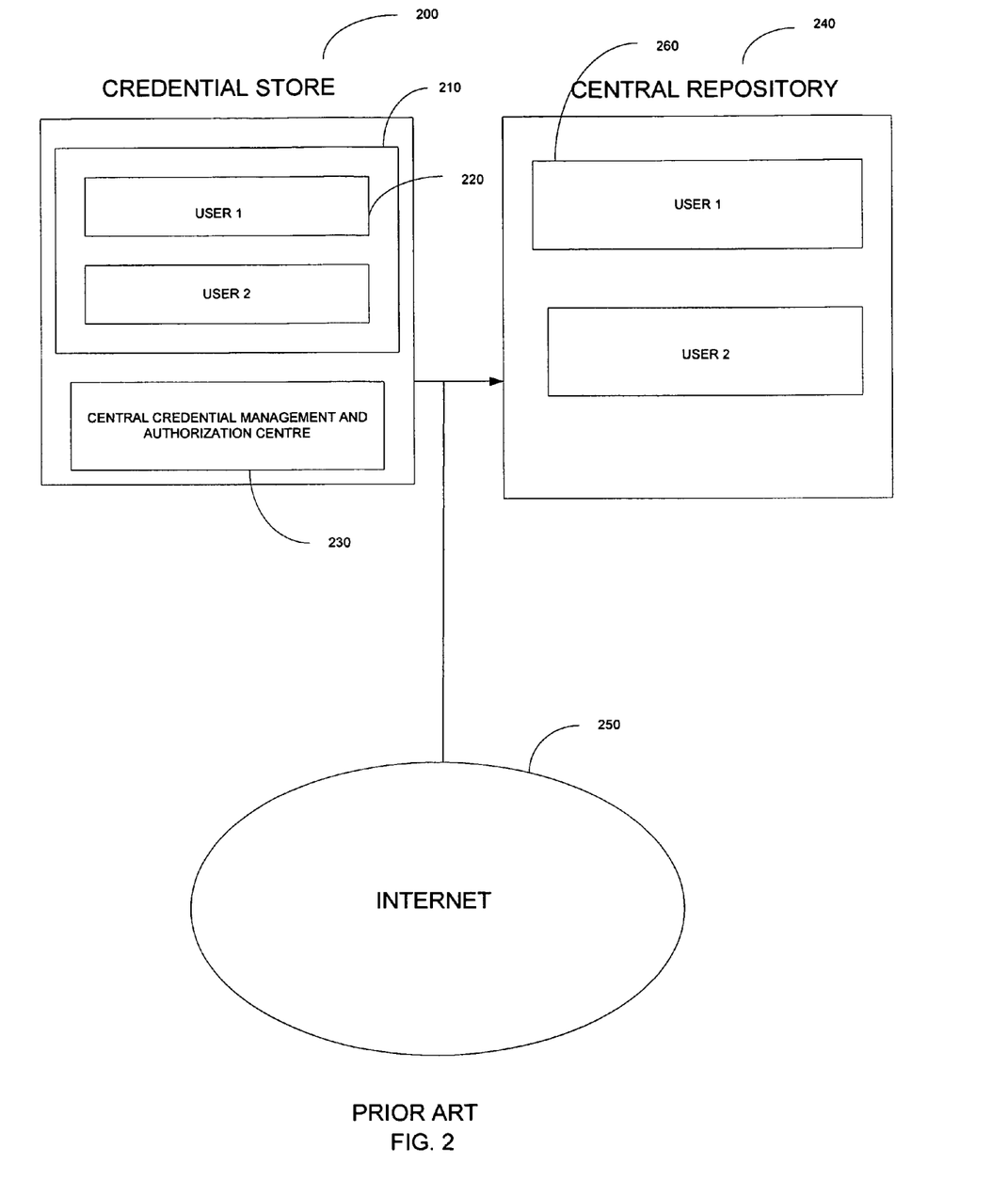
FIG. 2 shows a block diagram of a backup copy being sent automatically from the credential store to the central repository, according to the prior art.

A person's certificates and corresponding private or secret keys are typically included in the person's credentials. FIG. 2 shows a block diagram of a system in which a backup copy of user's credentials 220 being sent automatically from a credential store 200 to a central repository 240. The credential store 200 stores information concerning all the users who are registered with the central credential management and authorization center 230. Each user has its own credentials 220, which are stored within central database 210. The credential store 200 maintains the security of credentials 220 it has issued because it controls their storage, updating, revocation and also proxying. A copy of credential store 200 is automatically sent to central repository 240 each time something important changes in credential store 200. Central repository 240 then stores credentials 220 into storage 260.

Figure 3:
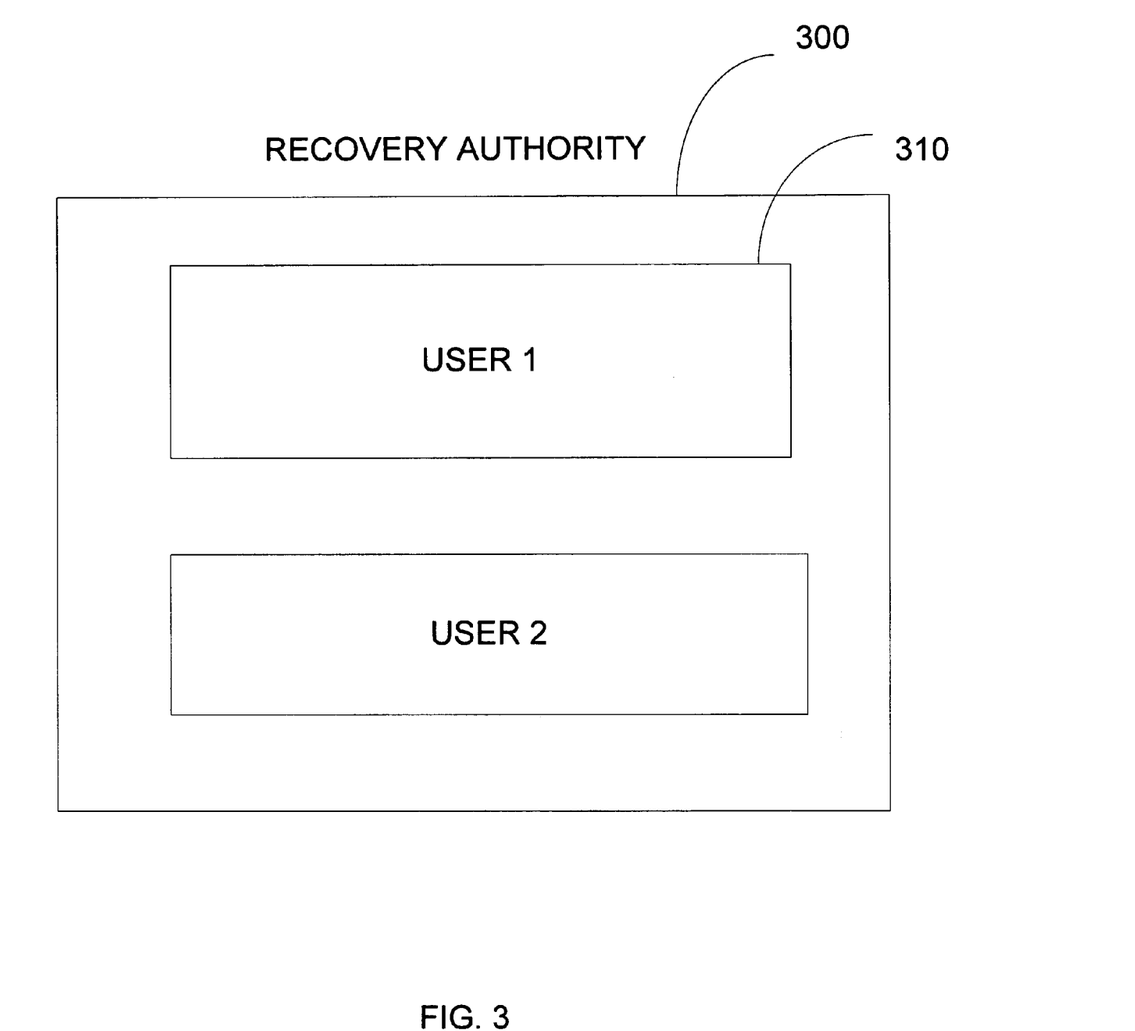
FIG. 3 shows a block diagram of a recovery authority, according to one embodiment of the invention.

FIG. 3 shows a block diagram of a recovery authority, according to one embodiment of the invention. Recovery authority 300 stores credentials 220 into storage systems 310. Each credential store 200, stored in the storage system 310, contains a number of unique recovery passwords for their own credential store 200. If a user 140 forgets his password to his credentials 220, he would contact a number of recovery authorities 300 to get the needed recovery passwords to open his credentials 220 and reset the password to a new one.

Prior to the present invention, these systems automatically initiated password protected backups of the user's credential store according to a fixed algorithm, without any involvement or input on the part of users or administrators. However, this created a problem because the only time user credentials 220 were sent to the credential store 200 was when something changed in the credential store 200. There is therefore a need for users to be able to initiate and control aspects of the backup process through a button in the user interface, which would increase flexibility and result in a more robust behavior in environments where the hard-coded algorithm is not satisfactory. In addition, in the past, recovery passwords were a hard coded length of 16 characters. Users were having trouble typing in 16 characters so they wanted recovery passwords of shorter length. There is therefore a need for more flexibility so that recovery authorities will not need to relay long information to users to recover credentials.

SUMMARY OF THE INVENTION

The present invention provides a method for enabling a user to initiate a password protected backup copy of the user's credentials. The method includes providing a user with a credential store containing information relating to the user's identity, generating a different recovery password of any length for each recovery authority, encrypting the recovery password for each recovery authority, storing the encrypted recovery passwords in the credential store, and sending a copy of the information by the user from the credential store to a central repository.

In another embodiment, a symmetric key is based on a password. The portion of information is encrypted with the public key. The private key is then encrypted with the symmetric key. The recovery password is also encrypted with each recovery authority's public key.

In another embodiment, the user manually initiates a backup copy of the user's credentials.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 4:
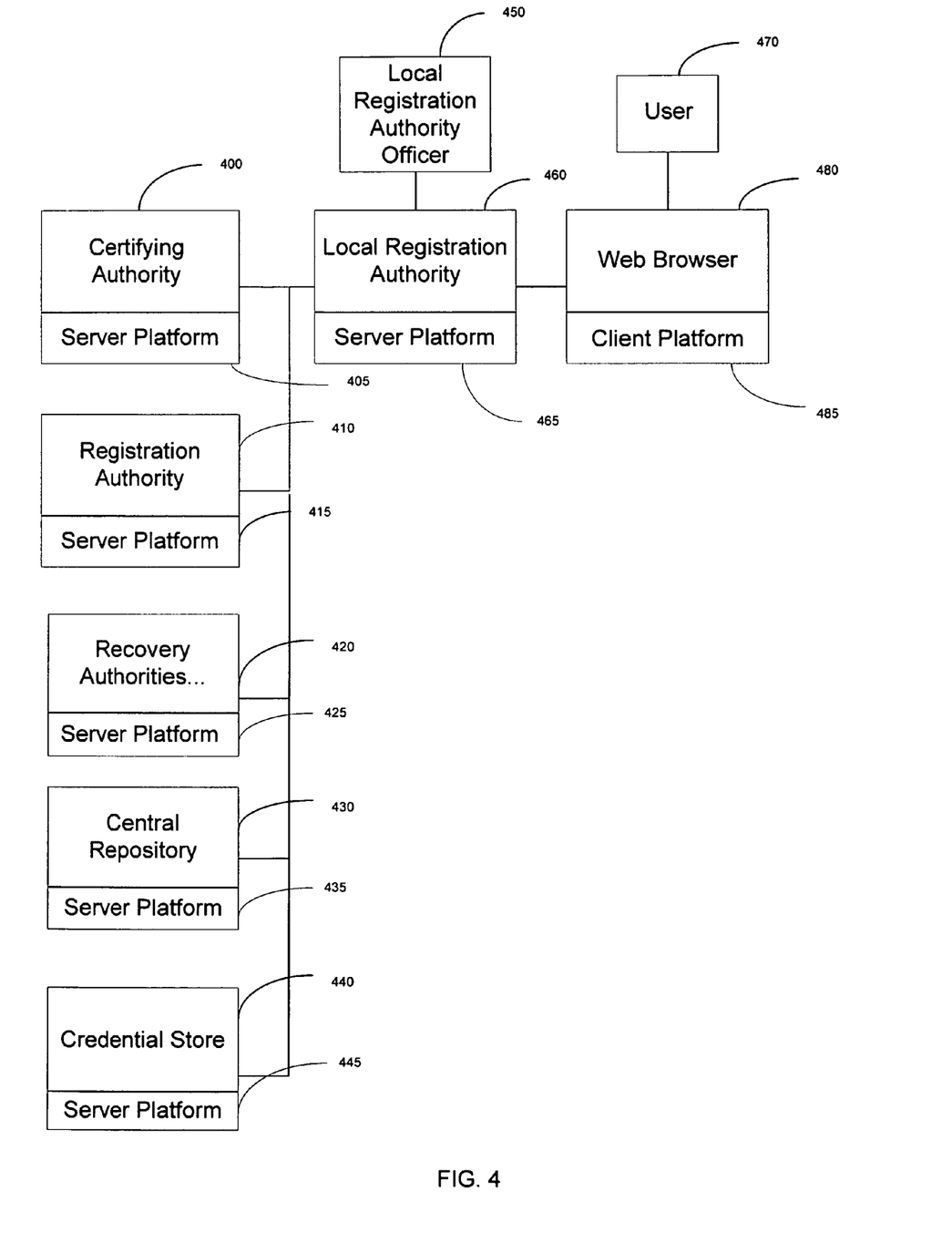
FIG. 4 shows a block diagram of an exemplary system architecture in which PKI processes may be practiced according to one embodiment of the invention.

FIG. 4 shows a block diagram of an exemplary system architecture in which PKI processes may be practiced according to one embodiment of the invention. As mentioned above, certifying authority 400 provides storage of certificates and related information. Certifying Authority 400 may be software executed on server platform 405. Certifying Authority 400 is configured with recovery information such as a quorum number, a location of the credential store, a length of recovery passwords and a list of recovery authorities. The quorum number is used to determine how many recovery authorities, explained further below, are needed to recover a credential store 440 from the central repository 430. An administrator determines this quorum number based on the number of people he thinks are needed to be convinced that the user requesting the recovery password is who they are. Registration authority 410 may also be software executed on server platform 415. Recovery authority 420 may also be software executed on server platform 425 and may provide the function of recovering keys as will be described below. Central repository 430 may also be software executed on server platform 435. Credential store 440 may also be software executed on server platform 445.

Figure 5:
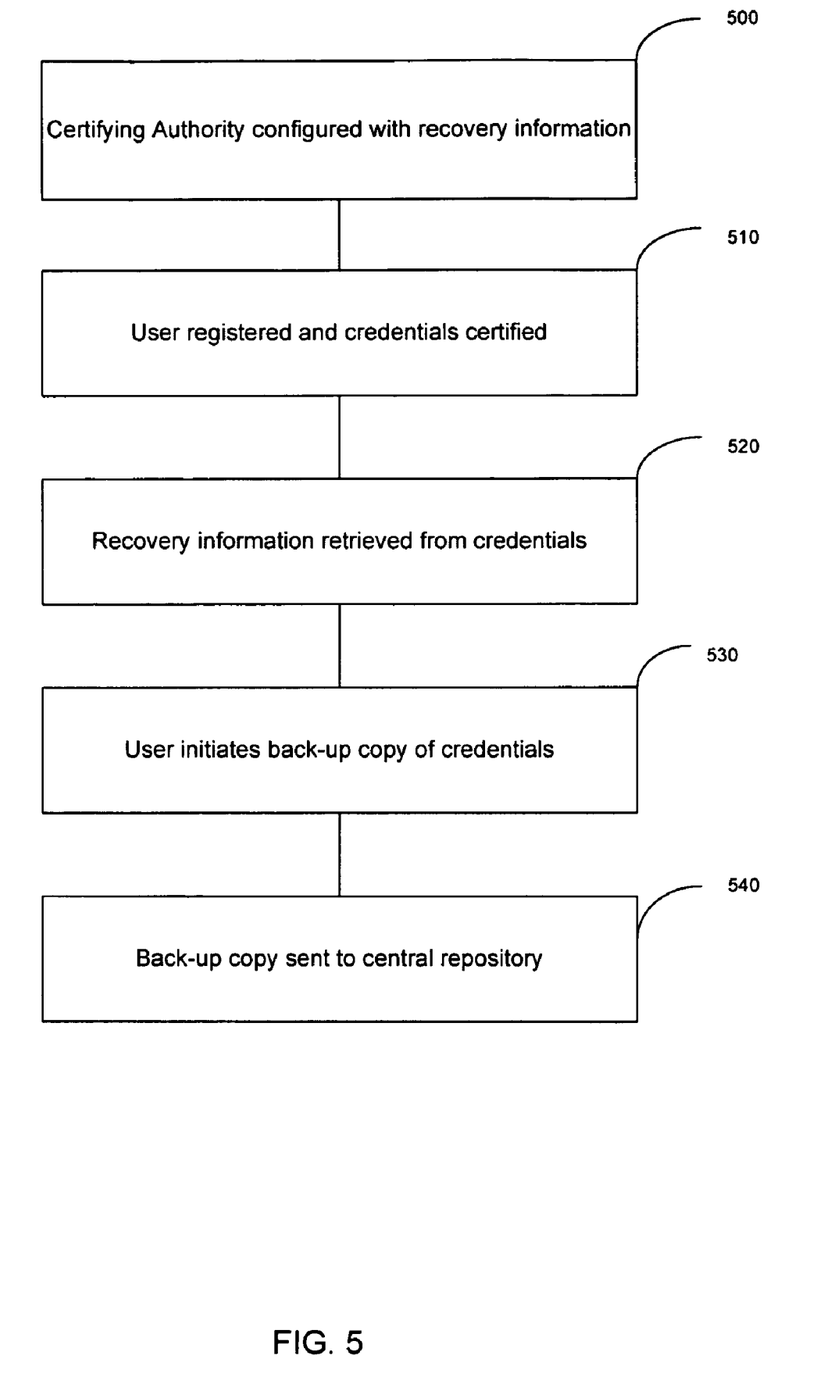
FIG. 5 illustrates a flowchart of an example process for enabling a user to initiate a password protected backup of his credentials according to one embodiment of the invention.

FIG. 5 illustrates a flowchart of an example process for enabling a user to initiate a password-protected backup of his credentials according to one embodiment of the invention. The certifying authority 400 is configured with recovery information, step 500. The user 470 is registered by registration authority 410 and his credentials are certified by certifying authority 400, step 510. During step 510, recovery information is embedded in the credentials. When the user 470 initiates a backup of his credentials, the recovery information is retrieved from the credentials, step 520. The backup copy of credentials 220 is multi-password protected and encrypted for each configured recovery authority, step 530, that is, a different recovery password is assigned to each recovery authority, and then mailed to central repository 430, step 540. Recovery passwords are generated randomly by the software during the importing of the recovery information into the user's credentials.

The following steps will describe the process of FIG. 5 in more detail. User 470 is assigned by Registration Authority 410 a credential store 440 that contains his private information. To protect the private information in credential store 440, user 470 encrypts the private information. The user then thinks of a password, which is used to create a symmetric key cryptographically (i.e. $f(x)=z$; z is unique and x is the password—if the user provides x then z can be obtained as a function of x at any time). This symmetric key may either be a 64-bit RC2 key or a 128-bit RC2 key or other such keys as known to those of skill in the art. User 470 also generates a random public and private key pair. The pair is typically a 1024-bit Basic Encoding Rules (BER)-formatted Rivest Shamir Adleman (RSA) key pair. User 470 encrypts the private information with the public key, so only the private key can decrypt it. User 470 encrypts the private key with the symmetric key, so only the symmetric key can decrypt it. A standard RSA encryption may be used. User 470 then stores the encrypted private key and public key into credential store 440. Anytime user 470 needs to get his private information in credential store 440, he provides the password, to the software, which is used to create the symmetric key, which is used by RSA Data Security Inc. cryptographic Application Program Interfaces (APIs) to decrypt the private key in credential store 440, which in turn is used by RSA to decrypt the private information in credential store 440.

The Recovery Authority 420 is configured to help recover the user's credentials if he lost or forgot his credential store password that enables the user to get his credentials. To safeguard the user from forgetting his password and not being able to eventually get to the private key, recovery authorities 420 are added to the process in the following manner. User 470 decides on a list of recovery authorities. User 470 then looks up the public key for each recovery authority 420. The public keys are typically 512 bytes long or longer. User 470 then thinks of a recovery password for each recovery authority 420. Traditionally, the first 8 bytes of each recovery password was converted into a 16 character long hex string. At the time, it was believed that this password would be more secure. In embodiments of the present invention, the recovery password may be converted to any length at the cost of security. In other words, the administrator can decide whether he wants more security and harder to use recovery passwords (longer length passwords) or less secure and easier to use passwords (shorter length passwords).

User 470 takes those recovery passwords and encrypts the symmetric key mentioned above with a quorum requirement. This may be accomplished using a k/n encryption scheme introduced for multi-password-protected ID files. User 470 then stores this encrypted symmetric key in credential store 440. Each recovery password is encrypted with the public key of each recovery authority, respectively. User 470 stores those encrypted recovery passwords in credential store 440. A hash of the credential store's password is also stored in the credential store. Each recovery authority can then get its recovery password by decrypting it with its private key. Traditionally, any time critical information in the credential store was changed, a new "encrypted backup" was automatically sent to central repository 430. In this invention, a user interface button enables user 470 to send a copy of credential store 440 to central repository 430 without changing the contents of credential store 440. Credential store 440 contains the password and encrypted recovery password(s) along with information related to the user's identity. All this information will be sent to central repository 430.

The central repository 430 serves as a central location where a group of user's credential stores 440 can be easily found by one or more recovery authorities 420. It also serves as a central backup to the user 470 who loses his own copy of the credential store 440. The user 470 could access the central repository 430 and find a backup copy of the credential store 440 and the password would still be valid to access the user's credentials 220.

Figure 6:
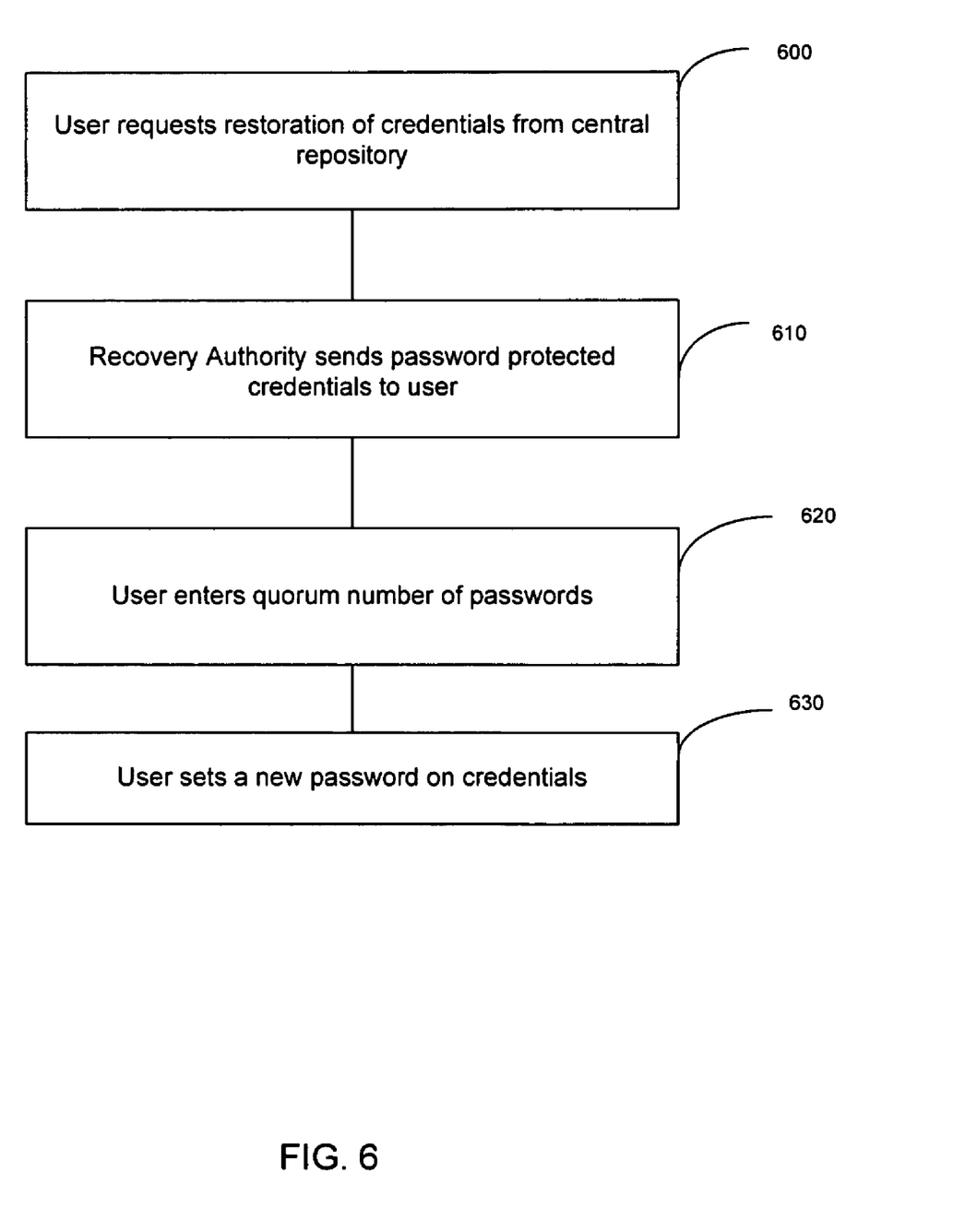
FIG. 6 illustrates a flowchart of an example process for restoring user credentials, according to one embodiment of the invention.

FIG. 6 illustrates a flowchart of an example process for restoring user credentials according to an embodiment of the present invention. In the future, user 470 could request restoration of his credentials 220 from central repository 430, step 600, by contacting a recovery authority 420. The recovery authority 420 retrieves the password protected credentials and sends it to user 470, step 610. User 470 must now enter the quorum number of recovery passwords, step 620, by contacting the quorum of recovery authorities 420, each of which will provide a unique recovery password to user 470. When the quorum number of recovery passwords has been entered, user 470 is asked to set a new password on the credentials, step 630.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for enabling a user to protect a password stored in a central repository and maintained by a plurality of recovery authorities and to initiate a backup copy of the user's credentials, the method comprising:
retrieving recovery information embedded in the user's credentials;
generating a symmetric key and a public key private key pair;
encrypting the user's credentials with the public key, wherein the private key is operable to decrypt the user's credentials encrypted with the public key;
encrypting said private key with said symmetric key;
identifying a plurality of recovery authorities from the recovery information embedded in the user's credentials;
retrieving a public key for each of the plurality of recovery authorities;
generating a recovery password for each of the plurality of recovery authorities based on at least a portion of a user-defined password for the plurality of recovery authorities;
encrypting the symmetric key with each recovery password, wherein the symmetric key encryption includes a quorum requirement of the recovery password generated for each of the plurality of recovery authorities, wherein decrypting the symmetric key includes retrieving the generated recovery passwords from the plurality of recovery authorities; and
encrypting each recovery password of the plurality of recovery authorities with each respective recovery authority's public key.

2. The method according to claim 1, comprising the user manually initiating backup of the user's credentials.

3. The method according to claim 2, wherein the user manually initiating backup of the user's credentials comprises overwriting encrypted symmetric keys and encrypted recovery passwords generated for each of the plurality of recovery authorities stored in the central repository without overwriting contents stored in a credential store.

4. The method according to claim 1, comprising encrypting a portion of the user's credentials with said public key.

5. The method of claim 1, wherein a Certifying Authority used for certifying the user, is configured with the recovery information.

6. The method according to claim 5, wherein the recovery information comprises a quorum number of recovery authorities.

7. The method according to claim 5, wherein the recovery information comprises a location of a credential store.

8. The method according to claim 5, wherein the recovery information comprises a length of recovery passwords.

9. The method according to claim 5, wherein the recovery information comprises a list of recovery authorities.

10. The method according to claim 1, wherein different recovery passwords are of any length for each of said recovery authorities.

11. The method according to claim 1, comprising storing said encrypted symmetric key and said encrypted recovery password generated for each of the plurality of recovery authorities in a credential store.

12. The method according to claim 1, comprising updating the recovery password generated for each of the plurality of recovery authorities in a stored hash.

13. A method for enabling a user to protect a password stored in a central repository and to initiate a backup copy of the user's credentials, the method comprising:
providing a user with a credential store containing information relating to the user's identity;
retrieving recovery information embedded in the information relating to the user's identity;
querying the user for a password for encrypting at least a portion of said information;
receiving a user's password in response to said query;
generating a symmetric key and a public key private key pair, the symmetric key generated from the user's password;
encrypting the information relating to the user's identity with the public key, wherein the private key is operable to decrypt the information encrypted with the public key;
encrypting said private key with said symmetric key;
identifying a plurality of recovery authorities from the recovery information embedded in the information relating to the user's identity;
retrieving a public key for each of the plurality of recovery authorities;
generating a recovery password for each of the plurality of recovery authorities based on at least a portion of a user-defined password for the plurality of recovery authorities;
encrypting the symmetric key with each recovery password, wherein the symmetric key encryption includes a quorum requirement of the recovery password generated for each of the plurality of recovery authorities, wherein decrypting the symmetric key includes retrieving the generated recovery passwords from the plurality of recovery authorities;
encrypting each recovery password of the plurality of recovery authorities with each respective recovery authority's public key;
linking said user's password with said recovery password generated for each of the plurality of recovery authorities;
storing said user's password and said recovery password generated for each of the plurality of recovery authorities in the credential store; and
sending said portion of said information together with said user's password and said recovery password generated for each of the plurality of recovery authorities by the user from the credential store to the central repository.

14. The method according to claim 13, comprising the user initiating backup of the user's credentials by pushing a user interface button.

15. The method according to claim 14, wherein the user initiating backup of the user's credentials by pushing a user interface button comprises overwriting encrypted symmetric keys and encrypted recovery passwords generated for each of the plurality of recovery authorities stored in the central repository without overwriting contents stored in the credential store.

16. The method according to claim 13, comprising encrypting said portion of information with said public key.

17. The method of claim 13, wherein a Certifying Authority used for certifying the user, is configured with the recovery information.

18. The method according to claim 17, wherein the recovery information comprises a quorum number of recovery authorities.

19. The method according to claim 17, wherein the recovery information comprises a location of the credential store.

20. The method according to claim 17, wherein the recovery information comprises a length of recovery passwords.

21. The method according to claim 17, wherein the recovery information comprises a list of recovery authorities.

22. The method according to claim 13, wherein different recovery passwords are of any length for each of said recovery authorities.

23. The method according to claim 13, comprising updating the recovery password generated for each of the plurality of recovery authorities in a stored hash.

24. A system for enabling a user to protect a password stored in a central repository and to initiate a backup copy of the user's credentials, the system comprising:
 a recovery authority server operable to generate a recovery authority public key for each of a plurality of recovery authorities;
 a user server operable to:
  retrieve recovery information embedded in the user's credentials;
  generate a symmetric key and a public key private key pair;
  encrypt the user's credentials with the public key, wherein the private key is operable to decrypt the user's credentials encrypted with the public key;
  encrypt the private key with the symmetric key;
  identify the plurality of recovery authorities from the recovery information embedded in the user's credentials;
  retrieve the recovery authority public key for each of a plurality of recovery authorities from the recovery authority server;
  generate a recovery password for each of a plurality of recovery authorities based on at least a portion of a user-defined password for the plurality of recovery authorities;
  encrypt the symmetric key with each recovery password, wherein the symmetric key encryption includes a quorum requirement of the recovery password generated for each of the plurality of recovery authorities, wherein decrypting the symmetric key includes retrieving the generated recovery passwords from the plurality of recovery authorities;
  encrypt each recovery password of the plurality of recovery authorities with each respective recovery authority's public key;
 a credential store operable to store the recovery password generated for each of the plurality of recovery authorities and the symmetric key; and
 a central repository operable to store one or more backup copies of content items from the credential store.

* * * * *